United States Patent
Huber et al.

(10) Patent No.: US 9,929,615 B2
(45) Date of Patent: Mar. 27, 2018

(54) WINDING ARRANGEMENT AND METHOD FOR PRODUCING A WINDING ARRANGEMENT

(71) Applicant: Robert Bosch GmbH, Stuttgart (DE)

(72) Inventors: Michael Huber, Rheinmuenster (DE); Werner Bloedt, Baden-Baden-Neuweier (DE); Gerold Schleif, Sinzheim-Kartung (DE); Marcin Ostrowski, Buehl (DE); Klemens Heid, Ottersweier (DE); Lukas Eberle, Karlsruhe (DE); Ralf Meier, Buehl-Balzhofen (DE)

(73) Assignee: Robert Bosch GmbH, Stuttgart (DE)

( * ) Notice: Subject to any disclaimer, the term of this patent is extended or adjusted under 35 U.S.C. 154(b) by 290 days.

(21) Appl. No.: 14/840,470

(22) Filed: Aug. 31, 2015

(65) Prior Publication Data

US 2016/0065022 A1     Mar. 3, 2016

(30) Foreign Application Priority Data

Aug. 29, 2014   (DE) .................. 10 2014 217 289

(51) Int. Cl.
  *H01R 39/32*  (2006.01)
  *H02K 3/50*   (2006.01)
  *H02K 3/48*   (2006.01)

(52) U.S. Cl.
  CPC ............... *H02K 3/50* (2013.01); *H02K 3/48* (2013.01)

(58) Field of Classification Search
  CPC .. H02K 3/28; H02K 3/12; H02K 3/48; H02K 3/50; H02K 15/065
  USPC ................................. 310/234, 179
  See application file for complete search history.

(56) References Cited

U.S. PATENT DOCUMENTS

| | | | | |
|---|---|---|---|---|
| 5,407,142 A | * | 4/1995 | Trevisan | H02K 15/085 |
| | | | | 242/433 |
| 5,470,615 A | * | 11/1995 | Sbalchiero | H02K 15/12 |
| | | | | 118/624 |
| 6,300,704 B1 | * | 10/2001 | Maldener | H02K 13/04 |
| | | | | 29/598 |
| 2013/0243626 A1 | * | 9/2013 | Kim | H02K 3/02 |
| | | | | 417/410.1 |

FOREIGN PATENT DOCUMENTS

| | | |
|---|---|---|
| DE | 2620917 | 12/1977 |
| DE | 19826886 | 12/1999 |
| DE | 102009001543 | 9/2010 |

* cited by examiner

*Primary Examiner* — Hanh Nguyen

(74) *Attorney, Agent, or Firm* — Michael Best & Friedrich LLP

(57) ABSTRACT

A winding arrangement in a machine component for a rotary electrical machine (1), comprising:
  a plurality of slots (11);
  a winding (7) which is wound with a winding conductor (8) and has a plurality of coils (12) which each run through two of the slots (11), wherein coil sides, which are accommodated in the slots (11), of at least one last-wound coil (16) are exposed toward corresponding slot openings of the slots (11); and
  at least one fixing winding (17, 20*a*, 20*b*) which is formed by a section of the winding conductor (8) and has at least one fixing turn which runs transversely across a coil head (14) of the at least one last-wound coil (16) of the winding (7).

22 Claims, 3 Drawing Sheets

WINDING ARRANGEMENT AND METHOD FOR PRODUCING A WINDING ARRANGEMENT

BACKGROUND OF THE INVENTION

The present invention relates to a winding arrangement for an electrical machine, and also to a method for producing a winding arrangement of this kind for an electrical machine.

It is generally known that a machine component of an electrical machine, such as a stator or a rotor, for example, can be wound using different winding techniques. In the process, slots in the machine component are provided with a winding wire with the aid of winding techniques such as flyer winding, needle winding or coil winding, for example.

Depending on the geometric configuration and arrangement of the slots in the machine component and the winding scheme used, there is a risk of a section or a turn of the winding wire coming loose or slipping from the last-wound coil and escaping from the slot. It is possible for the winding wire to slip or come loose as early as during the winding process during production of the electrical machine, during the course of subsequent manufacturing steps for assembly or during operation of the electrical machine. If that section of the winding wire which has slipped or shifted enters the air gap in the electrical machine, this can lead to a mechanical blockage.

Document DE 198 26 886 discloses a rotor for an electric motor which has an additional wrapping around the connection wires in the region between the commutator and the rotor body. This additional wrapping has the effect that the connection wires have a greater degree of stability, and therefore no fatigue failure can occur during operation, in particular during the so-called vibration tests. However, the wound wires of the rotor or of the armature are not separately secured or fixed by this additional wrapping, and therefore it is still possible for the slipping of the wire described further above to occur.

Document DE 26 20 917 discloses a method and an arrangement for fixing free winding ends of rotor windings by impregnation. In the process, prior to impregnation, one or more absorbent threads or tapes are placed around the free winding ends over the entire circumference and the end pieces of said threads or tapes are passed to so-called trickle stations.

In further embodiments of this document, impregnation resin is applied only to the end pieces of the absorbent threads or tapes. A variant in which the end pieces of the absorbent threads or tapes are inserted into the slots is also known.

Ultimately, all of said variants serve to fix the winding wire against mechanical forces which occur during operation with the aid of additional means, such as the threads or tapes which are provided with impregnation resin, for example.

These additional means increase the material costs and create additional complexity during assembly of the electrical machine.

SUMMARY OF THE INVENTION

The object of the present invention is therefore to provide a winding arrangement for a machine component of an electrical machine and also a method for producing a winding arrangement of this kind, wherein it is ensured that no section or no turn of the winding wire escapes from the slots in the machine components.

This object is achieved by the winding arrangement for an electrical machine according to the invention and also by the machine component, the electrical machine and the method for producing a machine component according to the invention.

According to a first aspect, a winding arrangement in a machine component for a rotary electrical machine is provided, said winding arrangement comprising:

a plurality of slots;

a winding which is wound with an, in particular, continuous winding conductor and has a plurality of coils which each run through two of the slots, wherein coil sides, which are accommodated in the slots, of at least one last-wound coil are exposed toward corresponding slot openings of the slots; and at least one fixing winding which is formed by a section of the winding conductor and has at least one fixing turn which runs transversely across a coil head of the at least one last-wound coil of the winding.

One concept of the above winding arrangement is that of providing a winding scheme for a winding which contains one or more fixing turns. In this way, one or more fixing turns can be placed over the coil head of the last-wound coil by way of one section, in particular an end section, as a result of which the turns of the last-wound coil are fixed. In this way, it is possible to fix the entire winding without the use of additional means.

During winding, the fixing winding can be provided as part of the entire winding in accordance with the prespecified winding scheme, and therefore production of the one or more fixing turns immediately follows winding of the winding.

Furthermore, a winding pitch of the at least one last-wound coil can be at least two.

In particular, the fixing turn can have a winding pitch which is different from, in particular greater than, that of the at least one last-wound coil. This provides a way for the at least one fixing turn to run at an angle across the last-wound coil.

According to one embodiment, the fixing turn can run through slots which are different from the slots of the at least one last-wound coil.

Provision can be made for the at least one fixing turn to run through two slots such that the at least one fixing turn runs transversely across coil heads of at least two last-wound coils.

According to one embodiment, the at least one fixing turn can cross the winding head of the at least one last-wound coil at an angle of between 10° and 90°, preferably of between 20° and 90°, further preferably of between 40° and 90°, and in particular of between 60° and 90°, with respect to the running direction of the winding conductor. Therefore, the winding conductor can be fixed by the fixing turn in a particularly reliable manner.

Provision can be made for each of the number of fixing turns to be passed through the same slots, wherein the number of fixing turns is between 1 and 5. Particularly when more than one fixing turn is provided through the same slots, more retaining force can be exerted onto the coil head of the last-wound coil, and therefore improved fixing of the winding is possible.

Furthermore, the at least one fixing turn is deflected, in particular at an angle of between 5° and 140°, preferably of between 20° and 120°, preferably of between 30° and 90°, further preferably of between 35° and 60°, at a rotor shaft on which the machine component is arranged. Owing to the change in direction of the fixing turn, a further region of the machine component in which a last-wound coil is arranged can be reached, and therefore particularly good fixing is possible.

In particular, a plurality of fixing turns which intersect one another can be provided.

According to a further aspect, a machine component of an electrical machine having the above winding arrangement is provided.

Furthermore, the machine component can be in the form of a rotor of the electrical machine, wherein a commutator is provided for making contact with the coils of the winding so that current is alternately applied to one or more of the coils when the rotor rotates, wherein the fixing windings are connected to commutator connections such that no current flows through a commutator connection in the fixing winding in any rotor position. In other words, the commutator connections of the commutator are used only to fix the ends of the fixing winding, and the arrangement of commutator segments and sliding contacts ensures that no current can be applied to the fixing winding at any point in time.

According to a further aspect, an electrical machine having the above machine component is provided.

According to a further aspect, a method for producing a winding arrangement for a machine component of a rotary electrical machine is provided, said method comprising:

winding a plurality of slots in the machine component with a winding conductor in order to obtain a winding having a plurality of coils which each run through two of the slots, wherein coil sides, which are accommodated in the slots, of at least one last-wound coil are exposed toward corresponding slot openings of the slots; and forming a fixing winding having at least one fixing turn comprising at least one section of the winding conductor, wherein the at least one fixing turn runs transversely across a coil head of the at least one last-wound coil of the winding.

BRIEF DESCRIPTION OF THE DRAWINGS

Embodiments will be explained in greater detail below with reference to the appended drawings, in which.

DETAILED DESCRIPTION

Figure 1:
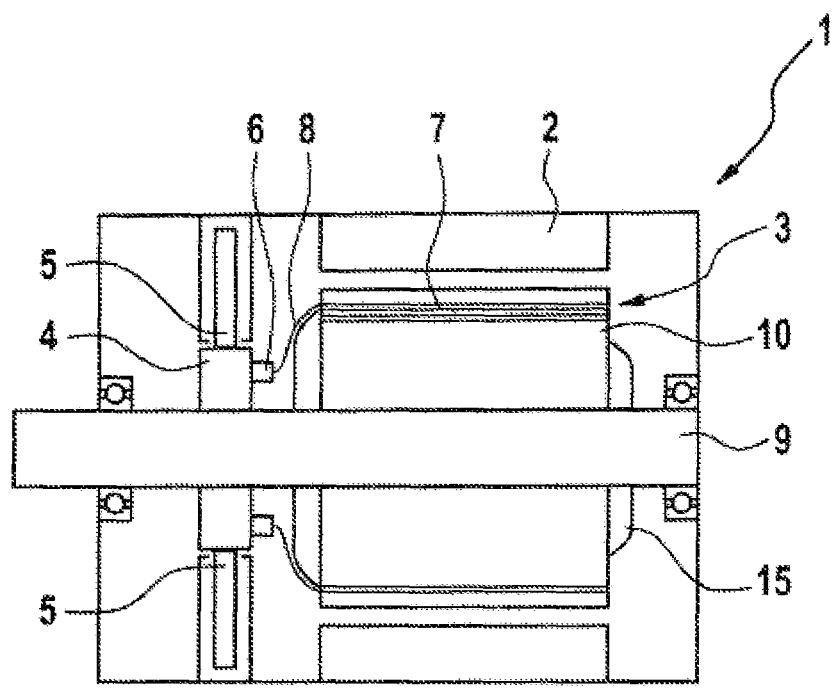
FIG. 1 shows a schematic illustration of a rotary brush-commutated electrical machine.

FIG. 1 shows a rotary electrical machine 1 which comprises a stator 2 having pole shoes (not shown). The stator 2 defines a circular-cylindrical inner recess 3. A rotor 10 having a winding is arranged in the inner recess 3 of the stator 2 such that it can rotate about a rotor shaft 9.

Current is supplied to the winding of the rotor 10 by means of a segmented commutator 4 and sliding contacts 5, usually in the form of carbon brushes.

Generally, both the stator 2 and the rotor 10 can be wound with a winding and constitute machine components of the electrical machine 1.

The winding 7 of the rotor 10 is designed with the aid of a winding conductor 8 which, starting from a commutator connection 6 of the commutator 4, is passed to a rotor 10 and there forms one or more coils of the winding 7. In the further course of the winding conductor 8, it is returned to a further commutator connection 6 of the commutator 4. This connection scheme for the coils of the winding 7 can be performed several times with a continuous winding conductor 8 or with separate winding conductors.

The winding conductor 8 or the winding wire can be formed from an electrically conductive metal, for example from copper or aluminum, and can be coated with an insulating coating or another kind of insulation in order to avoid electrical short-circuits when sections of the winding conductor 8 touch one another.

Figure 2:
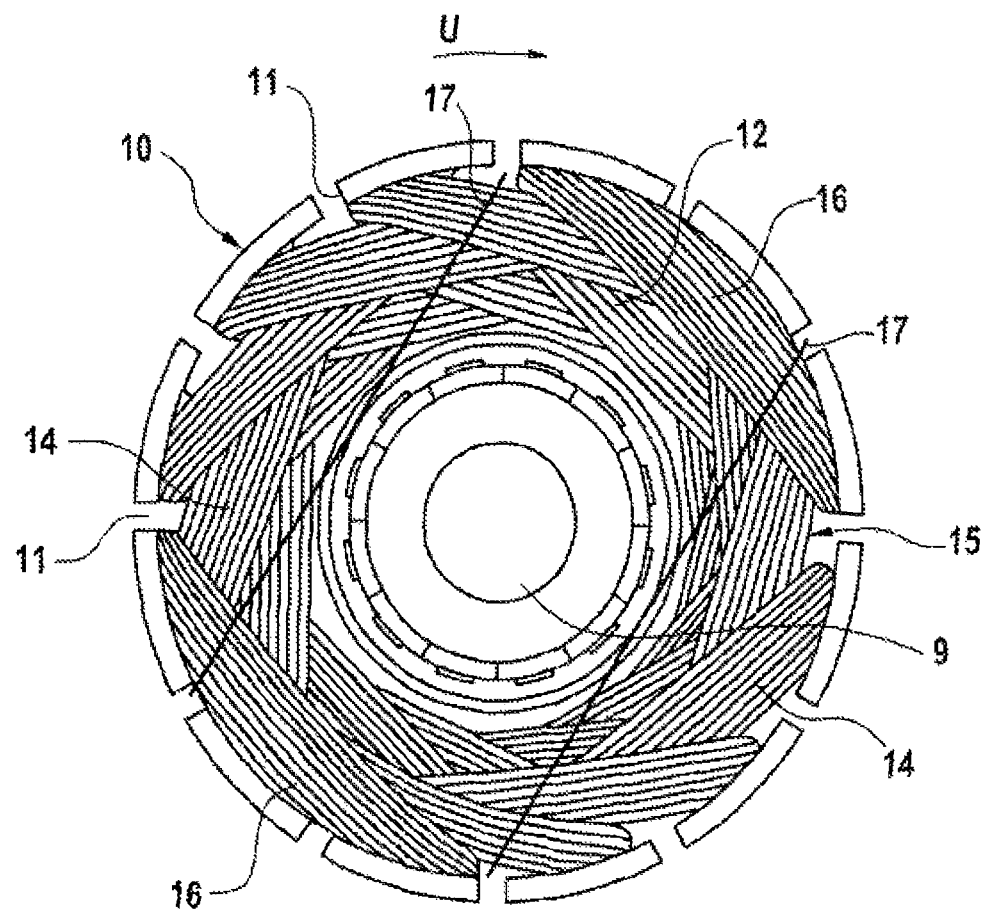
FIG. 2 shows a plan view of a bottom face of a rotor of an electrical machine having a fixing turn.

FIG. 2 shows a plan view of an end face of the rotor 10 of the electrical machine 1 from FIG. 1. The rotor 10 has a rotor body with radially running slots 11 (12 slots in the present exemplary embodiment) which are spaced apart in the circumferential direction U. Coil sides of coils 12 of the winding 7 are located in the slots 11.

The coils 12 are wound in accordance with a conventional winding scheme and each have winding pitches of greater than 1. The winding pitch determines the spacing between the slots 11 through which coil sides of the respective coil 12 are passed, indicated in the number of slots 11. The coils 12 can be wound as shown, for example, with a winding pitch of 1:4 and therefore have a slot spacing of 3.

At the end faces of the rotor 10, the coils 12, with their respective coil heads 14, form a winding head 15. When the rotor 10 is wound, the coils 12 are wound into the slots 11 in the rotor 10 in succession. This leads to the coil heads 14 being arranged one above the other at the end face of the rotor 10. As a result, the coil heads 14 of the first-wound coils 12 are covered by coil heads 14 of coils 12 which are wound subsequently.

Only the coil heads 14 of last-wound coils 16 are situated topmost on the winding head. The turns of the last-wound coils 16 in question are therefore not fixed by coil heads 14 of further coils 12, and individual turns of the last-wound coils 16 can escape from the slots 11 in question and lead to damage to or failure of the electrical machine 1.

In order to secure the external turns of the last-wound coils 16 against slipping or shifting, at least one fixing winding 17 is now provided, said fixing winding finally preferably being wound using the same winding process, running transversely across one or both (axially opposite) coil heads 14 of the last-wound coils 16 and holding said coil heads in their desired arrangement in this way. The fixing winding 17 can have one or more turns through two or more than two slots.

In order to achieve a situation whereby the at least one fixing winding 17 runs transversely across the at least one coil head 14 of the last-wound coil 16, a greater winding pitch (with a slot spacing of 5 in the shown exemplary embodiment in FIG. 2) than the winding pitch for the last-wound coil 16 is provided for said fixing winding 17. As a result, the fixing winding 17 extends across a segment of the winding head and as a result can ensure fixing of the free, that is to say uncovered, coil heads 14.

The fixing winding 17 can be arranged, in a substantially electrically neutral manner, between two external connections, such as the commutator connections 6, for example, and therefore performance parameters cannot be adversely affected during operation of the electrical machine 1 by the provision of the at least one fixing winding 17. In particular, the fixing winding 17 can be electrically connected to the commutator 4 such that said fixing winding is always free of current, that is to say current is never applied to two connections of the fixing winding in any rotor position. In other words, the commutator connections 6 of the commutator 4 are used only to fix the ends of the fixing winding 17 and it is ensured, owing to the design or arrangement of commutator segments and sliding contacts, that current cannot be applied to the fixing winding 17 at any point in time.

As an alternative, the at least one fixing winding 17 can be wound directly after the last-wound coil 16 without making contact with a commutator connection 6, and therefore electrical series interconnection of the last-wound coil 16 and the at least one fixing winding 17 is achieved.

It is generally expedient for the winding pitch of the at least one fixing winding 17 to be greater than the winding pitch of the last-wound coils 16 of the rotor 10. In particular, provision can be made for the difference between the slot spacing in respect of the winding pitch to be at least 2, preferably at least 3. In other words, the at least one fixing winding 17 can cross the winding head of the at least one last-wound coil 16 with respect to the running direction of the winding conductor 8 at an angle of between 10° and 90°, preferably of between 20° and 90°, further preferably of between 40° and 90°, and in particular of between 60° and 90°.

Depending on the selected winding pitch, the at least one fixing winding 17 can be deflected at the rotor shaft 9 or, assuming suitable insulation, at the commutator 4. The deflection allows a greater degree of freedom in terms of configuration for the at least one fixing winding 17. Therefore, the deflected fixing winding 17 can run through slots 11 which are situated between the slots 11 through which the coil sides of the last-wound coils 16 run. One example of the position of a deflected fixing winding 17 is illustrated by dashed lines in FIG. 2. The deflection can be performed, in particular, at an angle of between 5° and 140°, preferably of between 20° and 120°, preferably of between 30° and 90°, further preferably of between 35° and 60°.

The at least one fixing winding 17, which can also be considered to be a last part of the total winding which is wound by the winding scheme, is formed from an end section of the winding conductor 8, so that the at least one fixing winding 17 can be wound directly during the winding process, and therefore no further manufacturing steps are required and the rotor 10 does not have to be removed from the winding tool between winding of the winding 7 and winding of the at least one fixing winding 17.

Figure 3:
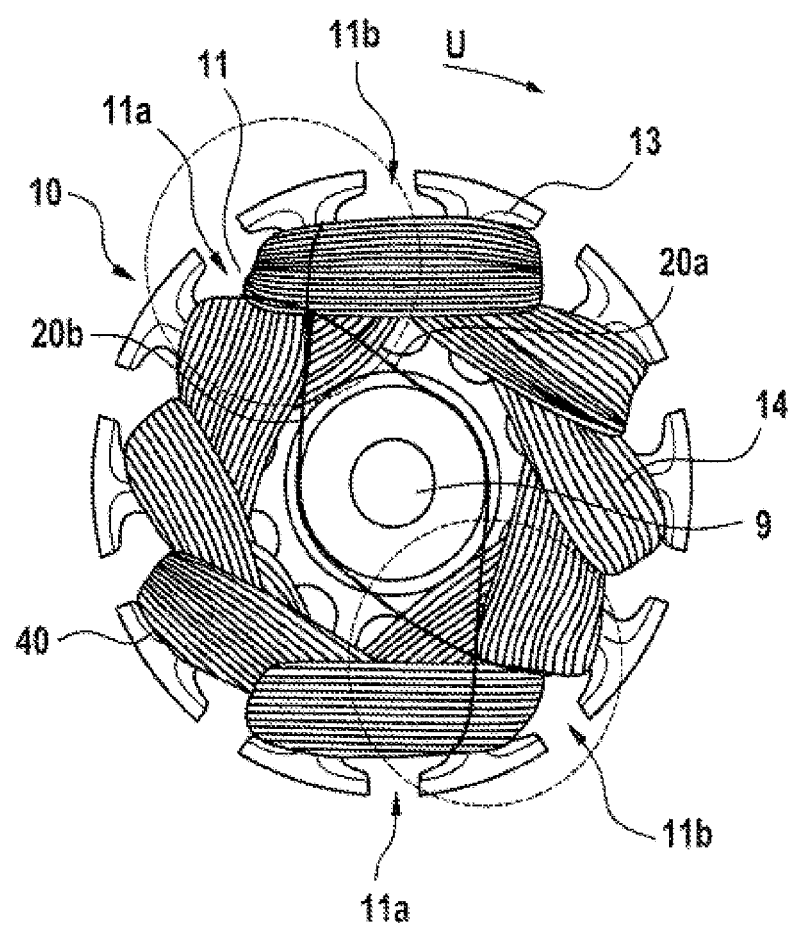
FIG. 3 shows a plan view of a bottom face of a rotor of an electrical machine having two fixing turns.

FIG. 3 shows a plan view of an end face of a further rotor 10 of an electrical machine which can be designed to be substantially comparable to the rotor in FIG. 2. The embodiment shown in said figure has fixing windings 20a, 20b which run through a first slot pair 11a and a second slot pair 11b. In each case one slot 11 of a slot pair 11a, 11b lie adjacent to one another. As a result, a section of the respective fixing winding 20a, 20b is deflected at the rotor shaft 9.

The sections of the fixing winding 20a, 20b intersect one another between the rotor shaft 9 and the respective slot 11 of the slot pairs 11a, 11b. The fixing windings 20a, 20b which run through the two slot pairs 11a, 11b form the shape of a wire loop in this case. As an alternative, the fixing windings 20a, 20b can also be passed through the slots 11 of the respective slot pairs 11a, 11b without any deflection.

What is claimed is:
1. A winding arrangement in a machine component for a rotary electrical machine (1), comprising:
   a plurality of slots (11);
   a winding (7) which is wound with a continuous winding conductor (8) and has a plurality of coils (12) which each run through two of the slots (11), wherein coil sides, which are accommodated in the slots (11), of at least one last-wound coil (16) are exposed toward corresponding slot openings of the slots (11); and
   at least one fixing winding (17, 20a, 20b) which is formed by a section of the winding conductor (8) and has at least one fixing turn which runs transversely across a coil head (14) of the at least one last-wound coil (16) of the winding (7).

2. The winding arrangement according to claim 1, wherein a winding pitch of the at least one last-wound coil (16) is at least two.

3. The winding arrangement according to claim 1, wherein the fixing winding (17, 20a, 20b) has a winding pitch which is different from that of the at least one last-wound coil (16).

4. The winding arrangement according to claim 1, wherein the fixing winding (17, 20a, 20b) runs through slots (11) which are different from the slots (11) of the at least one last-wound coil (16).

5. The winding arrangement according to claim 1, wherein the at least one fixing winding (17, 20a, 20b) runs through two slots (11) such that the at least one fixing winding (17, 20a, 20b) runs transversely across coil heads (14) of at least two last-wound coils (16).

6. The winding arrangement according to claim 1, wherein the at least one fixing winding (17, 20a, 20b) crosses the winding head of the at least one last-wound coil (16) at an angle of between 10° and 90° with respect to the running direction of the winding conductor (8).

7. The winding arrangement according to claim 1, wherein each of a number of the fixing windings (17, 20a, 20b) are passed through the same slots (11), wherein the number of fixing windings (17, 20a, 20b) is between 1 and 5.

8. The winding arrangement for an electric motor according to claim 1, wherein the at least one fixing winding (20a, 20b) is deflected at a rotor shaft (9) on which the machine component is arranged.

9. The winding arrangement for an electric motor according to claim 1, wherein a plurality of fixing windings (17, 20a, 20b) which intersect one another is provided.

10. A machine component of an electrical machine (1) having a winding arrangement according to claim 1.

11. The machine component according to claim 10, which is in the form of a rotor of the electrical machine (1), wherein a commutator (4) is provided for making contact with the coils (12) of the winding (7) so that current is alternately applied to one or more of the coils (12) when the rotor rotates, wherein the fixing winding is connected to commutator connections (6) such that no current flows through a commutator connection in the fixing winding (17, 20a, 20b) in any rotor position.

12. An electrical machine (1) having a machine component according to claim 10.

13. The winding arrangement according to claim 1, wherein the winding (7) is wound with a continuous winding conductor.

14. The winding arrangement according to claim 1, wherein the fixing winding (17, 20a, 20b) has a winding pitch which is greater than that of the at least one last-wound coil (16).

15. The winding arrangement according to claim 1, wherein the at least one fixing winding (17, 20a, 20b) crosses the winding head of the at least one last-wound coil (16) at an angle of between 20° and 90° with respect to the running direction of a winding conductor (8).

16. The winding arrangement according to claim 1, wherein the at least one fixing winding (17, 20a, 20b)

crosses the winding head of the at least one last-wound coil (16) at an angle of between 40° and 90° with respect to the running direction of a winding conductor (8).

17. The winding arrangement according to claim 1, wherein the at least one fixing winding (17, 20a, 20b) crosses the winding head of the at least one last-wound coil (16) at an angle of between 60° and 90° with respect to a running direction of the winding conductor (8).

18. The winding arrangement for an electric motor according to claim 1, wherein the at least one fixing winding (20a, 20b) is deflected at an angle of between 5° and 140°, with respect to a running direction of the winding conductor (8), at a rotor shaft (9) on which the machine component is arranged.

19. The winding arrangement for an electric motor according to claim 1, wherein the at least one fixing winding (20a, 20b) is deflected at an angle of between 20° and 120°, with respect to a running direction of the winding conductor (8), at a rotor shaft (9) on which the machine component is arranged.

20. The winding arrangement for an electric motor according to claim 1, wherein the at least one fixing winding (20a, 20b) is deflected at an angle of between 30° and 90°, with respect to a running direction of the winding conductor (8), at a rotor shaft (9) on which the machine component is arranged.

21. The winding arrangement for an electric motor according to claim 1, wherein the at least one fixing winding (20a, 20b) is deflected at an angle of between 35° and 60°, with respect to a running direction of the winding conductor (8), at a rotor shaft (9) on which the machine component is arranged.

22. A method for producing a winding arrangement for a machine component of a rotary electrical machine (1), said method comprising:
  winding a plurality of slots (11) in the machine component with a winding conductor (8) in order to obtain a winding (7) having a plurality of coils (12) which each run through two of the slots (11), wherein coil sides, which are accommodated in the slots (11), of at least one last-wound coil (16) are exposed toward corresponding slot openings of the slots (11); and
  forming a fixing winding (17, 20a, 20b) having at least one fixing turn comprising at least one section of the winding conductor (8), wherein the at least one fixing turn runs transversely across a coil head (14) of the at least one last-wound coil (16) of the winding (7).

* * * * *